United States Patent
Holland et al.

[11] 3,847,596
[45] Nov. 12, 1974

[54] PROCESS OF OBTAINING METALS FROM METAL HALIDES

[75] Inventors: Gerhard W. Holland; Rudolf Nowak, both of Frankfurt am Main, Germany

[73] Assignee: Halomet AG, Basel, Switzerland

[22] Filed: Feb. 22, 1972

[21] Appl. No.: 228,331

Related U.S. Application Data

[63] Continuation of Ser. No. 801,485, Feb. 24, 1969, abandoned.

[30] Foreign Application Priority Data
Feb. 28, 1968 Germany............................ 1583920

[52] U.S. Cl...................... 75/84.4, 75/84.5, 75/86
[51] Int. Cl..... C22b 5/00, C22b 9/10, C22b 53/00, C22b 19/02
[58] Field of Search...................... 75/84.4, 84.5, 86

[56] References Cited
UNITED STATES PATENTS
2,828,201   3/1958   Findlay .......................... 75/84.4

OTHER PUBLICATIONS
Maddex et al., Journal of Metals, Vol. 188, No. 4, 1950, AIME, pp. 634–640.

*Primary Examiner*—Carl D. Quarforth
*Assistant Examiner*—B. H. Hunt
*Attorney, Agent, or Firm*—Wilson & Fraser

[57] ABSTRACT

The invention relates to a process of producing a metal from a metal halide which comprises reduction of the metal halide with a reducing metal in a closed reactor. The temperature of the reaction is maintained above the melting point of the metal to be produced and at a vapor pressure at least at the vapor pressure of the halide melt formed during the reduction reaction.

22 Claims, 1 Drawing Figure

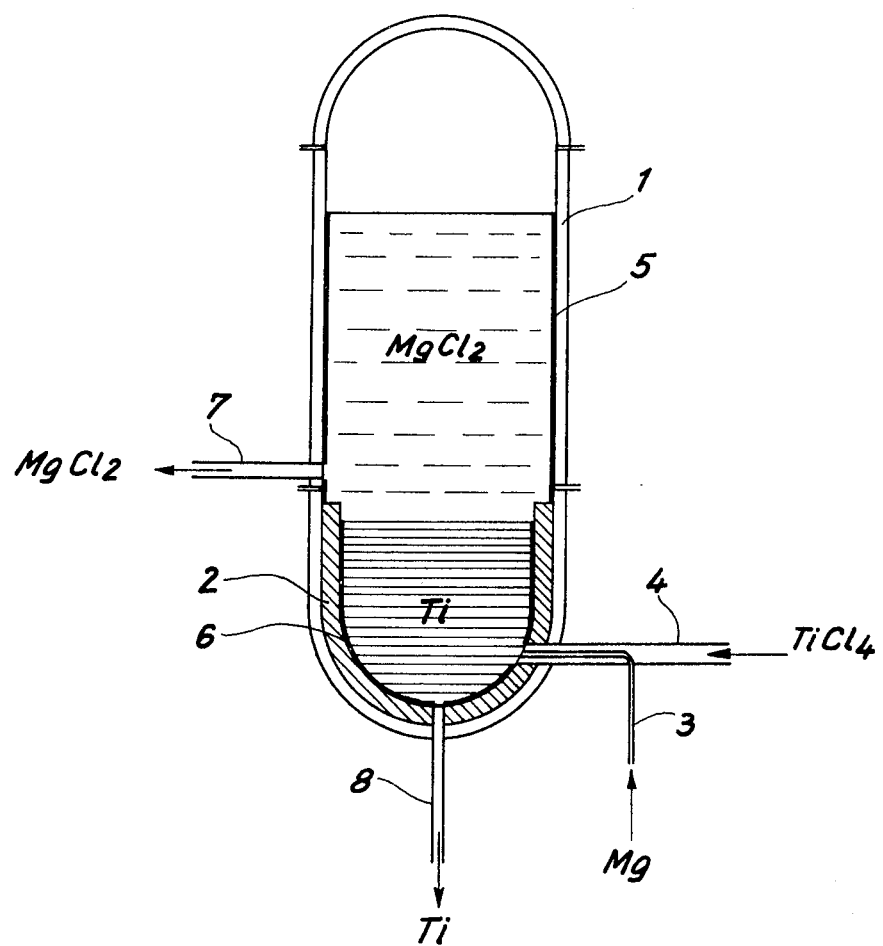

PROCESS OF OBTAINING METALS FROM METAL HALIDES

This is a continuation of application Ser. No. 801,485, filed Feb. 24, 1969, now abandoned.

This invention is directed to a reduction process for obtaining metals from metal halides in a closed reactor.

It heretofore has been known in the prior art to reduce metal halides by the use of reducing metals. A metal sponge is obtained along with a halide melt or vapor. The reducing temperatures are always lower than the melting temperatures of metals to be obtained from the halide. The gas pressure in the reaction chamber is about one atmosphere or lower. After the reduction is completed, the metal sponge obtained is melted down or sintered.

The prior art processes involve certain disadvantages. The metal sponge produced generally adheres to the reactor walls. Removal of the sponge from the walls and the halide melt is difficult and tools are usually required therefor. The halide melt is hygroscopic and care must be taken to keep gases in contact therewith absolutely dry. The metal sponge must be refined from the halides by the use of acids, caustic and water, wherein hydrogen is often generated producing metal hydrides. Due to the resultant brittleness of the metals containing the hydrides, the hydrogen must again be removed during refinement procedures.

The refined metal sponge is then melted down or sintered in an atmosphere of inert gases or in a vacuum, in crucibles of high temperature resistant oxides or graphite. In vacuum melting, the last traces of halides, subhalides and hydrogen are removed from the metal. Difficulties are encountered by the fact that the molten metals attack the crucible materials. The metal may pick up oxygen and foreign metals from the oxide crucibles, or carbon from the graphite crucibles. Accordingly, oxides, carbides and foreign metals impair the quality of the extracted metal and may even render it unusable.

In industrial production of titanium, a titanium sponge is ground to a powder, pressed into rods and melted down in a high vacuum arc furnace using a water-cooled copper ingot mold. If the arc is deflected to the ingot wall, there is a danger of a possible explosion in the furnace. Accordingly, protective walls and remote control equipment are necessitated.

In the production of iron alloys, a process has been proposed in which molten iron is treated with a halide of titanium, zirconium and vanadium, for example, and a reducing metal. The halide is reduced to the metal (e.g. titanium) and is dissolved in the molten iron, while at the same time a gaseous waste chloride is generated (e.g. magnesium chloride).

Other known processes produce alloys in such a manner that a melt consisting of a metal and a reducing metal is treated with a metal halide. Accordingly, these processes for the production of alloys cannot be used for the extraction of pure metals.

In processes wherein metals or alloys are extracted from halides above their melting points at pressures of one atmosphere or lower, waste gases are generated which contain, in addition to the halides of the reducing metals, large percentages of halides and subhalides of the metals to be reduced. The chemical conversions are therefore not quantitative. The separation of the halides as well as the conversion of the metal desired into halides and subhalides make the processes complicated and uneconomical.

It has also been proposed to extract titanium from titanium halides (e.g. titanium tetrachloride) by the use of an alkali metal, particularly sodium. The reaction is conducted in a closed reaction vessel and is induced thermally, by an electric arc, for example, in such a manner that the starting point of the reaction advances outwardly onto the walls of the vessel, whereby the reaction is controlled by cooling the walls of the vessel. The reaction product comprising metal and solid alkali halide is chipped and broken in order to be removed from the vessel. Unreacted alkali is removed and the metal-alkali halide mixture leached with water. The fragmentary and gravel-like titanium product is washed and dried, and consists of large and small sintered, and because of local overheating, fused lumps. The process has obvious disadvantages in that large amounts of manual labor are required, and the resultant metal product must be further be melted down for refinement.

All of the known processes in which a salt and metal are separated by leaching with water are subject to a further drawback in that the salt solution must be evaporated and the salt dehydrated in order to recover the reducing metal.

Accordingly, this invention provides a process for the extraction of metals by reduction of their halides, which overcomes the above-mentioned disadvantages of previous processes.

In this invention, the process of obtaining metals from their halides is conducted in such a manner that the metals are formed in a liquid state, that the heat required is supplied by exothermic reaction, that solid protective layers are formed on cool reactor walls by the metals, that contaminants by subhalides, hydrogen, and reactor materials are avoided, and that the chemical conversion is quantitative in nature.

The invention involves a process for the extraction of the metals by reduction of their halides with reducing metals in a closed reactor. In the process, the reduction is carried out at a temperature higher than the melting point of the metal being produced from the halide and at least at the vapor pressure of the halide melt being produced.

A reducing metal according to the present invention is a metal which, under the inventive reaction conditions, has a substantially higher affinity to the halogen of the metal halide to be reduced than the metal to be produced (said metal being bound to said halogen).

In the development of this invention, it was unexpectedly found that the halides of the reducing metals, which are formed during the reduction of the metal halides at temperatures above the melting points of the metals to be obtained, can be maintained in the liquid state within the closed reactor at a technically easily controlled vapor pressure.

Thus, in accordance with the invention, the metal halides to be reduced and the reducing metals are introduced into the closed reactor in which they react exothermally. The temperature at which the reaction proceeds and stabilizes in the process must be above the melting point of the metals to be obtained from the halides. The result is obtained by introducing the reactant materials at a preheated temperature in predetermined amounts per unit time, respectively. When the reactor is closed, the halide of the reducing metal on start up of the reaction at atmospheric pressure has been heated well above its vaporization temperature and can only be formed in the gaseous state, until its vapor pressure has reached the condensation pressure corresponding to the reduction temperature. From this time on during the reaction, the halide of the reducing metal is only formed in the liquid state. Consequently, the reduction will be carried out at the vapor pressure of the formed melt and at a temperature above the melting point of the metal formed from the halide. The vapor pressure includes the vapor pressure of the halide melt, the metallic melt, and also the pressure of an inert gas eventually introduced into the reactor, such as argon.

Due to the high affinity of the reducing metals for the halogens, and at the existing vapor pressure, the partial pressure of the subhalides within the vapor space above the melt is very low. Consequently, the halide melt consists practically only of the halide of the reducing metal. Apart from this fact, the vapor equilibrium above the melt is of no importance, since it remains continuous once it is reached, and no vapor is being removed from the reactor. The metal halide introduced into the reactor is converted quantitatively into metal.

The invention contemplates batch operation wherein the reactor is filled, reacted, allowed to stand and cool off, an to drain the liquid metal and/or halide melt after reaction. It is also contemplated that the process of the invention may be carried out continuously by withdrawing the liquid metal and halide melt while at the same time maintaining the required height of both fluid layers in the reactor by continuously feeding metal halide and reducing metal. The continuous process is especially advantageous in that it permits large production of metal with relatively small installations.

The following examples are specific embodiments of the invention but are not intended to be limiting in any sense:

EXAMPLE 1

In this example, the operation of a continuous process is described with reference to the drawing.

100 kg/hour of titanium are to be produced by the use of magnesium as the reducing metal, from $TiCl_4$. The reactor shown in the drawing is a closed vertical cylinder with an I.D. of 200 mm and a height of 600 mm. Its capacity is approximately 20 liters. It is fitted with a double wall 1 made of steel. The lower part is clad to a height of 300 mm with a magnesium spinel layer 2 of 50 mm thickness.

First, the reactor is degassed several times and rinsed with argon and finally evacuated. Hot liquid magnesium at a rate of 102 kg/hour and at a temperature of 700°C, and $TiCl_4$ gas at a rate of 46 $Cm^3$/hour and at a temperature of about 220°C, are introduced into the lower part of the reactor through two tangentially attached graphite tubes 3 and 4. This gives rise to a reaction temperature of about 1,500°C at which the reaction temperature stabilizes. Titanium is first formed in the solid state (melting point 1,667°C), while the generated $MgCl_2$ vaporizes (vaporization temperature 1,412°C). As the $MgCl_2$ vapor cannot escape, the pressure in the reactor rises until the partial pressure of $MgCl_2$ has finally reached about 5 atmospheres of pressure. At this state only liquid $MgCl_2$ is formed and the reaction temperature rises rapidly to about 1,750°C. In the course of this, the initially formed titanium melts, and from then on only liquid titanium is formed directly. The liquid $MgCl_2$ forms a layer floating over the liquid titanium.

Cold water flows through the double walled steel jacket, and the bottom and top cover of the reactor. While the liquid $MgCl_2$ is forming, a solid layer 5 of about 7 – 8 mm thickness is formed on the cooled steel wall, and a 4 – 5 mm thick layer of solid titanium 6 is formed on the cooled spinel lining.

The liquid $MgCl_2$ (400 kg/hour) is withdrawn slightly above the spinel lining through a graphite tube 7, while the liquid titanium (100 kg/hour) is drained through a cooled graphite tube 8 from the reactor bottom. The reaction heat generated at about 80,000 keal/hour is transferred to the cooling water by the solid $MgCl_2$ and titanium layers, the magnesium spinel lining and the steel wall. The cooling water (about 1.5 $m^3$/hour) leaves the reactor at a temperature of about 80°C.

In order to maintain the desired reaction temperature of about 1,730°C, the temperature of the $TiCl_4$ vapor is controlled. The vapor is fed to the reactor from a $TiCl_4$ vaporizer through a heater (not shown). A temperature increase of the $TiCl_4$-vapor from about 220°C to about 320°C corresponds to an additional heat input of about 5,000 keal/hour.

The liquid titanium can be removed continuously from the reactor as a liquid stream. It is also possible to pour it (under an argon atmosphere or in a vacuum) into water cooled copper ingot molds which produce titanium ingots of any desired shape or size. Obtaining the ingots under a vacuum is especially advantageous since traces of magnesium metal dissolved in the titanium will be vaporized out.

EXAMPLE 2

In this example, a batch product of liquid zinc is obtained from $ZnBr_2$ with aluminum as the reducing metal. Production is about 1 ton/hour of zinc in blocks. A reactor in principle as the one described in example 1 is used. However it is fitted only with a single steel jacket while the lower part of the reactor, lined with fire clay is removable by means of a flange. It has a capacity of 150 liters so that a quantity of 1 ton of zinc can accumulate in it. The reactor is charged with 280 kg of granular aluminum and is then closed. Within an hour, 3,440 kg of hot molten $ZnBr_2$ at a temperature of 425°C are added, which raises the reaction temperature to about 500°C where it is maintained. As the liberated reaction heat is only 900 local/hour, the natural cooling of the reactor by the ambient atmosphere is sufficient. The desired reaction temperature of about 500°C is maintained by adding zinc bromide hotter and/or faster when the temperature decreases, and cooler and/or slower when the temperature increases. Two layers form in the reactor, a lower liquid layer of zinc and above it a liquid layer of $Al_2Br_6$. At about 500°C, the vapor pressure in the reactor stabilizes at 45 about atmospheres. After the closed reactor has cooled, the lower part is opened at the flange and a zinc block of 1 ton weight is removed.

The process of the invention may be used as well with other halides such as fluorides and iodides. The process is especially advantageous for the production of metals melting at high temperatures such as beryllium, chromium, hafnium, iridium, manganese, molybdenum, niobium, tantalum, thorium and zirconium, etc. By utilizing the generated exothermic reaction heat in the reactor as a heating agent, it is possible to cool from the outside. The formed solid layers on the inner surfaces of the reactor protect the reactor from chemical attack and from high temperatures and keep the extracted metal pure. The possibility of cooling in the outside reactor jacket makes it possible to carry out the process even at high pressures.

In the event it is desired to produce an alloy, it is only necessary, either to load the halides of the desired alloy components in the proper ratio together into the reactor, reducing them together or sequentially in point of time, or, to introduce either metal in its elementary state before or during the reaction.

What is claimed is:

1. A process for production of a metal capable of being reduced from its halide by reduction thereof with a reducing metal, which comprises:
   a. introducing into a reaction zone having a closed vapor space a reducing metal in the molten state and a halide of said metal to be produced;
   b. reacting said metal halide and said reducing metal within said zone to obtain in the molten state, as reaction products in separate layers, the metal to be produced and the reducing metal halide;
   c. maintaining said reaction at a temperature above the melting point of said metal to be produced and at a vapor pressure which is above one atmosphere and at least at the vapor pressure of said reducing metal halide by feeding into said reaction zone below the surface of the molten mass, additional required amounts of either of said reducing metal and said metal halide; and
   d. separately removing said metal produced and said reducing metal halide from said reaction zone.

2. The process of claim 1 wherein the process is continuous and said reaction temperature is maintained by preheating the reactants and controlling the feed rates of the reactants into the said reaction zone.

3. The process of claim 2 wherein the reactants are continuously introduced into and the reaction products are continuously removed from said reaction zone.

4. The process of claim 1 wherein the process is a batch process and the reactants are introduced in batch quantities, and the reactants are removed from the reactor in batch quantities in the liquid state.

5. The process of claim 4 wherein the reaction products are permitted to cool in the reactor and are removed in batch quantities in the solid state.

6. The process of claim 1 wherein the metal halide is titanium tetrachloride, the reducing metal is magnesium and the reaction temperature is maintained above the melting point of titanium at about 1,730°C.

7. The process of claim 1 wherein the metal halide is zinc bromide, the reducing metal is aluminum and the reaction temperature is about 500°C.

8. The process of claim 1 wherein an metal alloy is produced by reduction of a mixture of metal halides.

9. The process of claim 1 wherein an alloy is produced from a sequential reduction of different metal halides.

10. The process of claim 1 wherein an alloy is produced by reduction of metal halide and adding an alloying elemental metal to said metal halide reduction reaction.

11. A process for production of a metal capable of being reduced from its halide by reduction thereof with a reducing metal, which comprises:
    a. introducing a reducing metal and a halide of said metal to be produced into a reaction zone having a closed vapor space;
    b. reacting said metal halide and said reducing metal within said zone to obtain in the molten state, as reaction products in separate layers, the metal to be produced and the reducing metal halide;
    c. maintaining said reaction at a temperature above the melting point of said metal to be produced and at a vapor pressure which is above one atmosphere and at least at the vapor pressure of said reducing metal halide by feeding into said reaction zone below the surface of the molten mass, additional required amounts of either of said reducing metal and said metal halide; and
    d. separately removing said metal to be produced and said metal halide from said reaction zone.

12. The process of claim 11 wherein the process is continuous and said reaction temperature is maintained by preheating the reactants and controlling the feed rates of the reactants into the said reaction zone.

13. The process of claim 12 wherein the reactants are continuously introduced into and the reaction products are continuously removed from said reaction zone.

14. The process of claim 11 wherein the process is a batch process and the reactants are introduced in batch quantities, and the reactants are removed from the reactor in batch quantities in the liquid state.

15. The process of claim 14 wherein the reaction products are permitted to cool in the reactor and are removed in batch quantities in the solid state.

16. The process of claim 11 wherein the metal halide is titanium tetrachloride, the reducing metal is magnesium and the reaction temperature is maintained above the melting point of titanium at about 1,730°C.

17. The process of claim 11 wherein the metal halide is zinc bromide, the reducing metal is aluminum and the reaction temperature is about 500°C.

18. The process of claim 11 wherein a metal alloy is produced by reduction of a mixture of metal halides.

19. The process of claim 11 wherein an alloy is produced from a sequential reduction of different metal halides.

20. The process of claim 11 wherein an alloy is produced by reduction of metal halide and adding an alloying elemental metal to said metal halide reduction reaction.

21. The process of claim 11 wherein the process is continuous and said reaction temperature is maintained by controlling the feed rates of the reactants into the said reaction zone.

22. The process of claim 11 wherein the process is continuous and said reaction temperature is maintained by preheating the reactants.

* * * * *